US006994372B2

(12) United States Patent

Ford et al.

(10) Patent No.: US 6,994,372 B2
(45) Date of Patent: Feb. 7, 2006

(54) AIR BAG COVER WITH ARTICULATED TEAR SEAM

(75) Inventors: Brian C. Ford, Mt. Clemens, MI (US); Lawrence R. Langbeen, Attica, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 93 days.

(21) Appl. No.: 10/210,248

(22) Filed: Aug. 1, 2002

(65) Prior Publication Data

US 2004/0021303 A1 Feb. 5, 2004

(51) Int. Cl.
*B60R 21/16* (2006.01)

(52) U.S. Cl. ................. 280/731; 280/728.3; 280/728.2

(58) Field of Classification Search ............ 280/728.2, 280/728.3, 731, 732

See application file for complete search history.

(56) References Cited

U.S. PATENT DOCUMENTS 5,152,548 A * 10/1992 Zushi ...................... 280/728.3
5,312,129 A * 5/1994 Ogawa .................... 280/728.2
5,505,483 A * 4/1996 Taguchi et al. .......... 280/728.2
5,573,267 A * 11/1996 Yamakawa et al. ...... 280/728.3
5,685,557 A * 11/1997 Persson et al. .......... 280/728.2
5,709,401 A * 1/1998 Schenck .................. 280/728.2
5,899,487 A * 5/1999 Fischer .................... 280/728.2
6,050,597 A * 4/2000 Coleman ................. 280/728.3
6,550,803 B1 * 4/2003 Derrick ................... 280/728.3

FOREIGN PATENT DOCUMENTS

DE 29606004 U1 * 5/1996

* cited by examiner

*Primary Examiner*—Ruth Ilan
(74) *Attorney, Agent, or Firm*—Markell Seitzman

(57) ABSTRACT

A steering wheel assembly having a fastenerless air bag module assembly is disclosed. This assembly employs a housing with a projection and a steering wheel armature configured to receive the projection. The cover is retained between the housing and the steering wheel armature. Furthermore, the present invention provides a steering wheel cover with a tear seam that permits the air bag to deploy more efficiently with less damage to the occupants.

13 Claims, 6 Drawing Sheets

AIR BAG COVER WITH ARTICULATED TEAR SEAM

BACKGROUND AND SUMMARY OF THE INVENTION

The present invention relates generally to steering wheel assemblies having air bags and, more particularly, to a cover for an air bag of a steering wheel assembly.

Air bags typically are located beneath a cover of a steering wheel assembly. Historically, the steering wheel was attached to the vehicle and then the air bag module, which included a cover attached over the air bag, was attached.

A steering wheel and air bag assembly includes a cover, a steering wheel armature and an air bag. Most covers are formed of a synthetic plastic material that is positioned over the air bag cushion. The cover is generally attached to the steering wheel assembly by rivets. In order for the air bag to deploy properly, it is necessary to provide a thinned portion for the air bag to break through the cover. Typically, the thinned regions included tear seams located in the cover that had generally been either H-shaped, I-shaped, U-shaped or branched shapes as viewed from the driver's seat.

The branched shapes of the tear seams require more energy and time to tear, thus the air bag must be deployed with a very high force for it to deploy and inflate rapidly enough to serve as a crash restraint. In addition, the high force used during deployment can cause the cover to break in high stress regions, resulting in reduced integrity of the air bag module. Additionally, the high deployment forces can lead to cracking or tearing of the module cover. Furthermore, these tear seam designs limit the area of opening in the cover and tend to cause the air bag to deploy straight outward rather than outward and to the sides. By allowing the air bag to expand quickly to the sides, the air bag inflates with less force and more efficiency.

The rivets used to couple the cover to the air bag housing require very labor intensive assembly procedures. Further, the rivets produce a high stress concentration interface between the cover and the air bag mounting plate, which can provide crack initiation sites. Air bag modules having an H-shaped or U-shaped cover experience significant stresses on the door hinges caused by inertial forces from the rotating of the door mass. As such, it is desirable to provide a cover design that enables the air bag cover to be retained without rivets with ensured integrity after deployment. It is also desirable to provide a tear seam that ruptures more rapidly and that will deploy in response to a lower inflation force.

The present invention provides a steering wheel assembly that receives a fastenerless air bag cover assembly that increases the integrity of the air bag module after deployment. This assembly employs a housing with a projection and a steering wheel armature configured to receive the projection. The cover is retained between the housing and the steering wheel armature. In addition, the present invention provides an air bag cover with a tear seam that permits the air bag to deploy more efficiently with less stress to the module. Specifically, the cover has a circular center from which at least one tear seam radiates. The tear seam ends at an articulated terminus.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

The present invention is generally related to an air bag cover for a steering wheel assembly. However, it is to be understood that the principles embodied herein are equally applicable to other types of applications involving air bags with covers.

Figure 1:
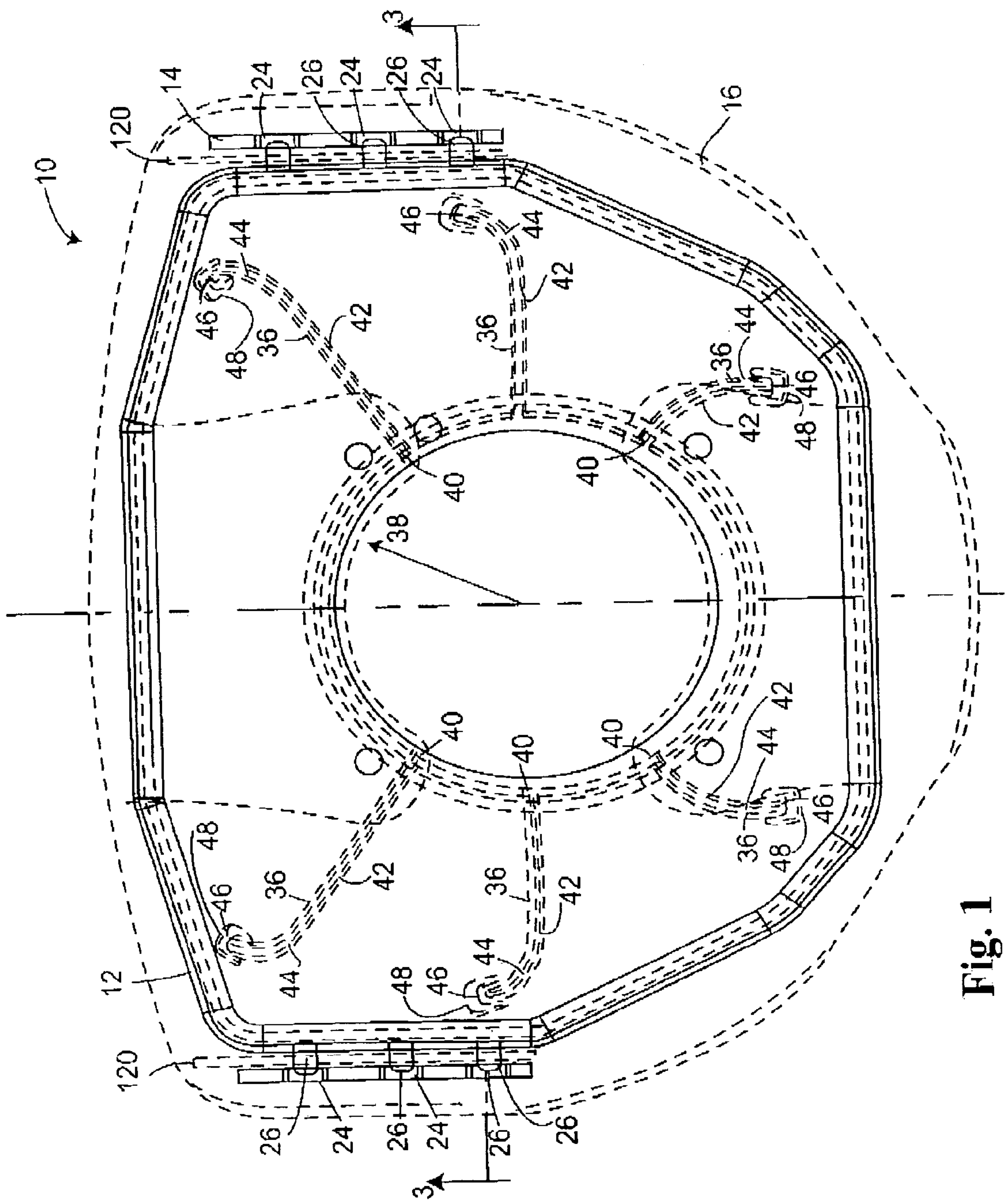
FIG. 1 is a rear view of a steering wheel and air bag assembly designed according to the present invention
Figure 2:
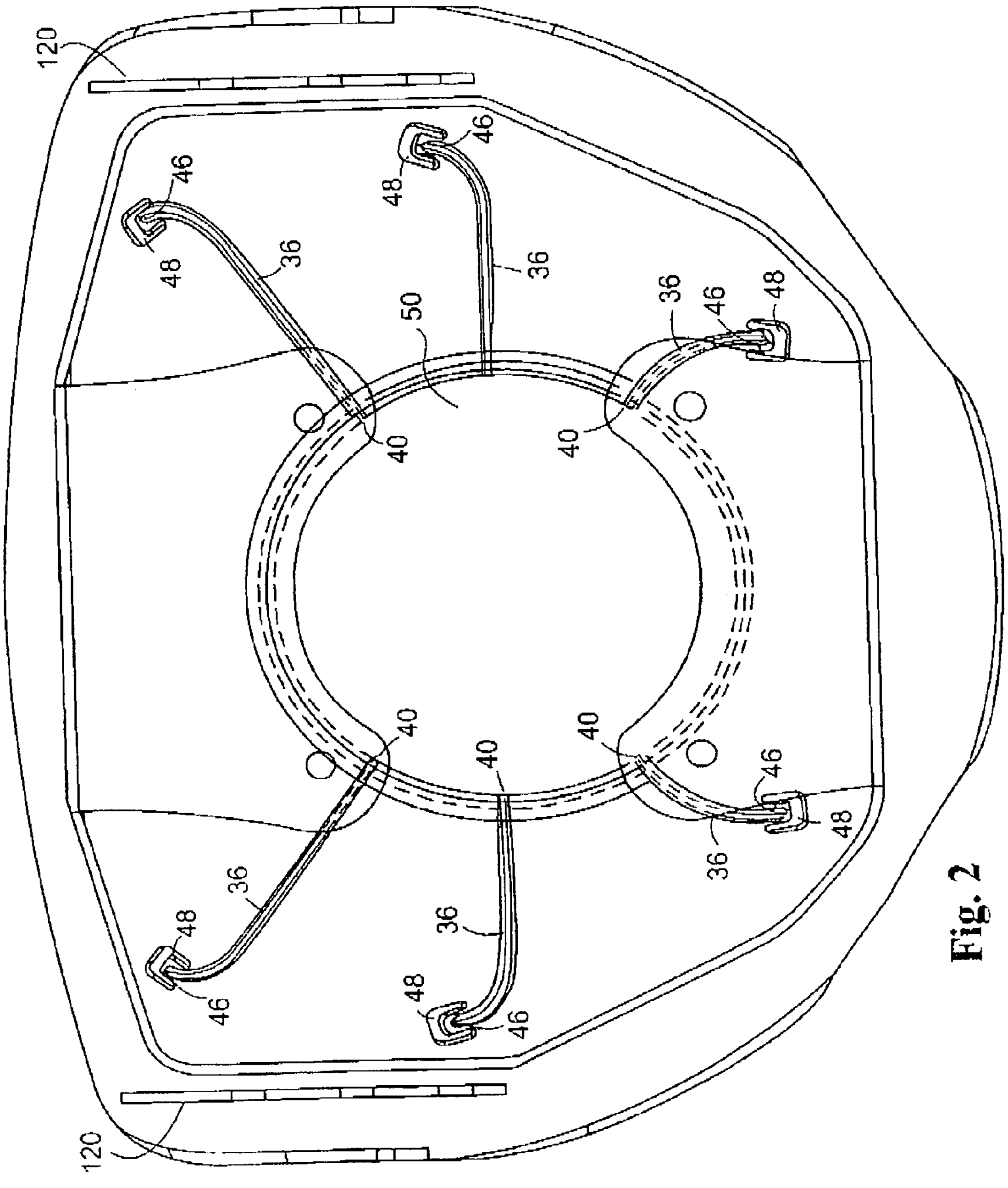
FIG. 2 is a rear view of the air bag cover depicted in FIG. 1.

Referring generally to FIGS. 1 through 2, an air bag module 10 is shown. The air bag module 10 includes a housing 12 coupled to a steering wheel armature 14. A cover 16 is retained by both the housing 12 and the steering wheel armature 14. The cover 16, which is shown in phantom for clarity, defines a plurality of retaining apertures 34, which are used to mount the cover 16 to the housing 12. The air bag module 10 also includes an inflator or gas generator (not shown) of known type to provide inflation gases to the folded air bag or cushion (not shown).

Figure 3:
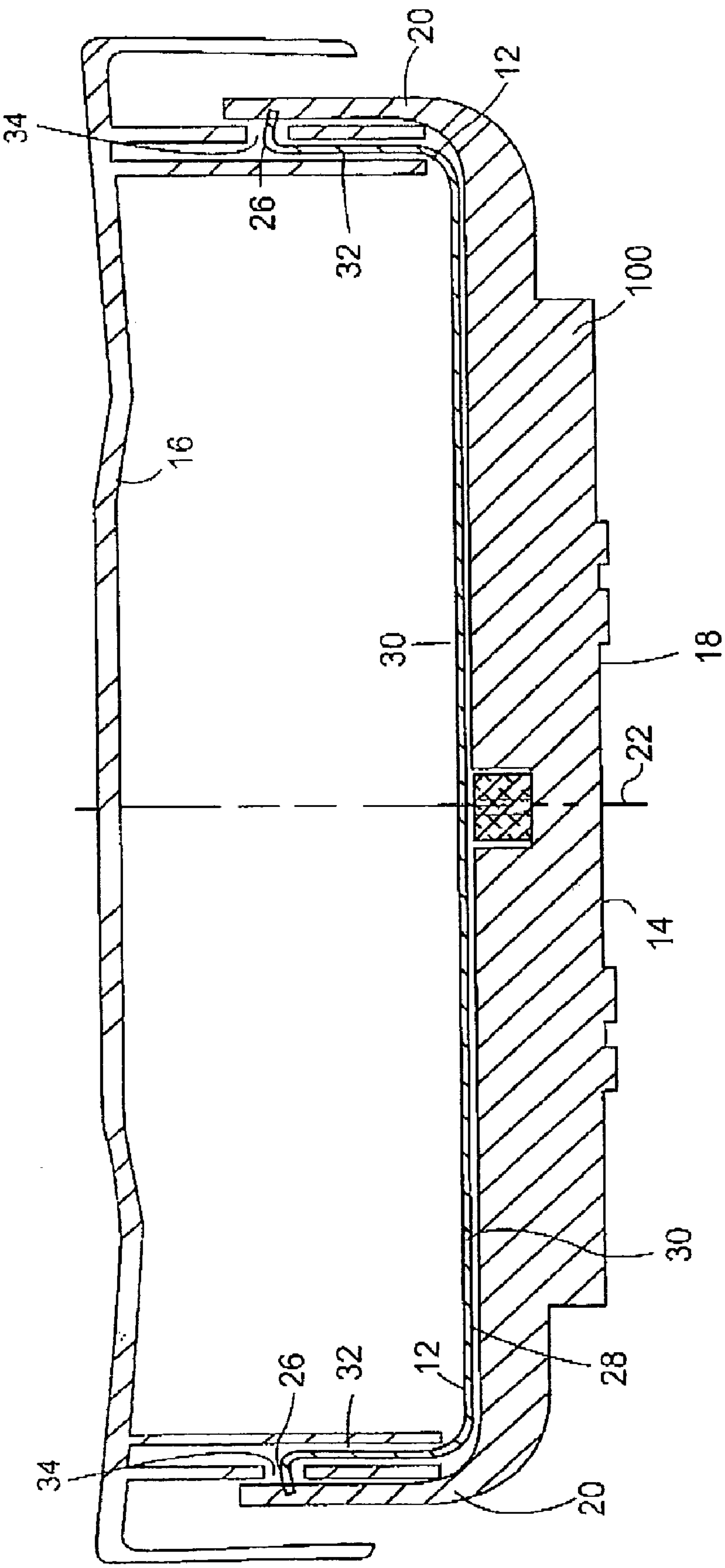
FIG. 3 is a cross sectional view of the steering wheel and air bag assembly along a line 3—3 in FIG. 1.

The steering wheel armature 14 includes a pair of support tabs and a pair of bosses (not shown) for supporting and retaining the housing 12. The steering wheel armature 14 is generally cup shaped, having a bottom 18 and sides 20. The steering wheel armature 14 is also symmetric to a vertical axis 22, as shown in FIG. 3. The shape of the steering wheel armature 14 can be varied, circular, triangular or trapezoidal as needed. The sides 20 of the steering wheel armature 14 each define at least one slot 24, which slidably accepts a retaining flange 26 formed on the housing 12. In this embodiment, there are three slots 24 in each side. An aperture for the steering column (not shown) is also located on the steering wheel armature 14. A mounting hole (not shown) is located in each of the armature bosses (not shown). Each of the retaining apertures 34 on the air bag cover 16 fit over one of the retaining flanges 26. An air bag inflator and an air bag cushion are located between the air bag cover 16 and the housing 12. The air bag inflator bracket is secured to the steering wheel armature 14 by means of mounting bolts (not shown) that extend through depending retaining holes.

The housing 12 of the air bag module 10 retains the air bag (not shown). As shown in FIG. 1, the housing 12 has a plurality of flanges 26. The housing 12 is preferably made from sheet metal such as stamped steel or aluminum. A body 28 of the housing 12 is generally cup-shaped having a bottom 30 and depending sides 32. The housing 12 is symmetric to the vertical axis 22. The shape of the housing 12 can be varied, circular, triangular or trapezoidal as needed. The flanges 26 extend from the sides 32 of the housing body 28, as shown in FIGS. 1 and 3. The flanges 26 are generally rectangular in shape, with a thickness of 1.5 mm and a width of 3 mm. The shape and dimensions may be varied as needed. As mentioned, the flanges 26 are designed to slide into the slots 24 of the steering wheel armature 14 and are also received within the receiving apertures 34 (such as in a snap fit manner) (shown in FIGS. 3 and 5). The snap fit of the flanges 26 into the slots 24 creates a structure that retains the airbag cover before, after and during deployment. In addition, the snap fit design simplifies the assembly of the air bag module 10 by eliminating the need for fasteners, such as rivets.

The cover 16 is generally made from thermoplastic olefin or a thermoplastic elastomer. The cover 16 has a plurality of retaining apertures 34, with the number of retaining apertures 34 equal to the number of the flanges 26 of the housing 12. The flanges 26 of the housing 12 slide through the retaining apertures 34 (see FIG. 5) and are placed within the support rib 120 to retain the cover 16. In FIG. 1, the cover 16 is shown with a specific geometry. However, the shape of the cover 16 may be a plurality of shapes such as, for example, rectangular or circular. As shown in FIG. 2, the cover 16 is also symmetrical with respect to the vertical axis 22. In addition, air bag cover 16 may also include an air bag scrim.

Referring now to FIG. 1, in addition to the retaining apertures 34, the cover 16 is shown with a plurality of tear seams 36. Although the cover 16 is shown as having six radially projecting tear seams 36, it can include any number of tear seams 36. The tear seams 36 originate from a circumference defined by a central radius 38 on the cover 16. The central radius 38 defines a through hole as shown, which is about four centimeters. However, the central radius 38 may vary for different air bag applications. The tear seams 36 are symmetric with respect to a vertical axis 22 and are evenly spaced with respect to the vertical axis 22. At an initiation end 40, the tear seams 36 have a linear section 42 beginning from the circumference defined by the central radius 38 and an articulating section 44, which occurs before reaching a terminal end 46.

The design of the tear seams 36 allows the air bag to deploy and effectively manage the tear propagation through the cover. The length of the linear section 42 of the tear seams 36 ranges from about two to about four centimeters. The length of the articulating section 44 of the tear seams 36 ranges from about one centimeter to about two centimeters and has a radius of curvature of about 13 mm. The articulating section 44 in the tear seams 36 near the terminal end 46 slows the progression of the tearing of the cover 16. Upon reaching the terminal end 46, the tear seams 36 encounter a rip stop 48. Rip stops 48 are formed by a raised rib to prevent the cover 16 from tearing further. The tear seams 36 are shown with constant thickness. It is envisioned that the thickness of the tear seams 36 can increase from the initiation end 40 to the terminal end 46 to further slow the progression of the cover 16.

As is shown in FIG. 2, a central opening 50 is defined in the cover. The central opening 50 is symmetrical with respect to the vertical axis 22, but can also be offset from the vertical axis 22. The central opening 50 can be used for inserting instrumentation as disclosed in commonly owned pending application Ser. No. 09/871,037.

Figure 4:
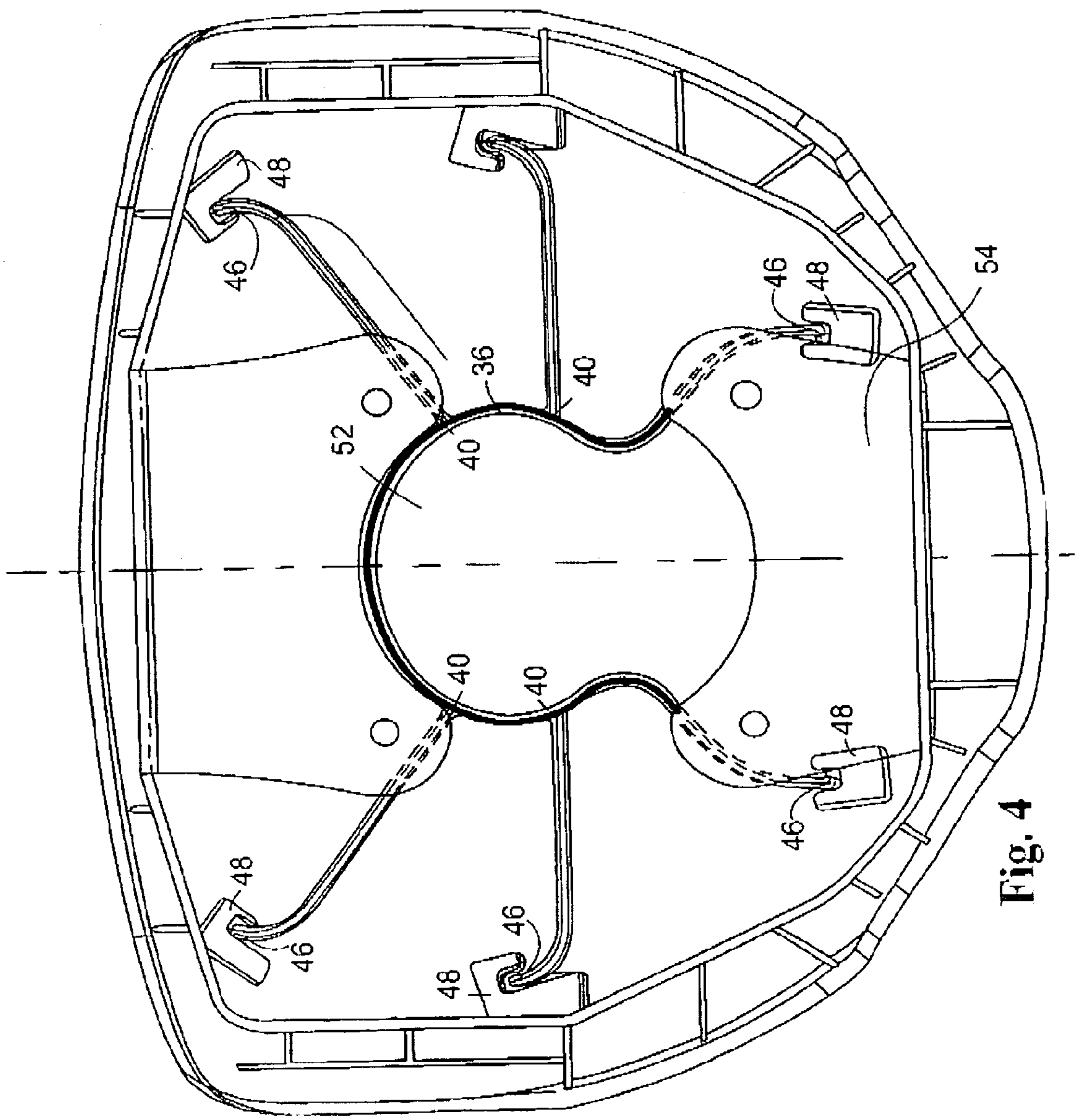
FIG. 4 is an alternate air bag cover according to a second embodiment of the invention.

As shown in FIG. 4 the cover 16 may include a generally circular central door 52. This embodiment allows for the advantages with respect to deployments outlined earlier. The central circular door 52 is surrounded by a generally circular tear seam 36, and coupled to the cover 16 by a hinge 54. The circular tear seam 36 functions as the initiation end 40 for the radially projecting tear seams 36. The circular central door 52 and articulating tear seams 36 additionally provide the benefit of significantly masking visual defects in the cover 16 such as read-through of the tear seam 36.

During the manufacturing process, the cover 16 is slid onto the flanges 26 of the housing 12. Next, the flanges 26 of the housing 12 are received within the slots 24 of the steering wheel armature 14. When the air bag is deployed, the tear seams 36 on the cover 16 begin separating at the initiation end 40 and slow as they begin to reach the terminal end 46. When the tear seam separation reaches the terminal end 46, the tearing of the cover 16 stops due to the rip stop 48. The sides 20 of the steering wheel armature 14 restrain bell mouthing of the housing 12 and prevent the retaining apertures 34 of the cover 16 from becoming disengaged from the flanges 26.

Figure 5:
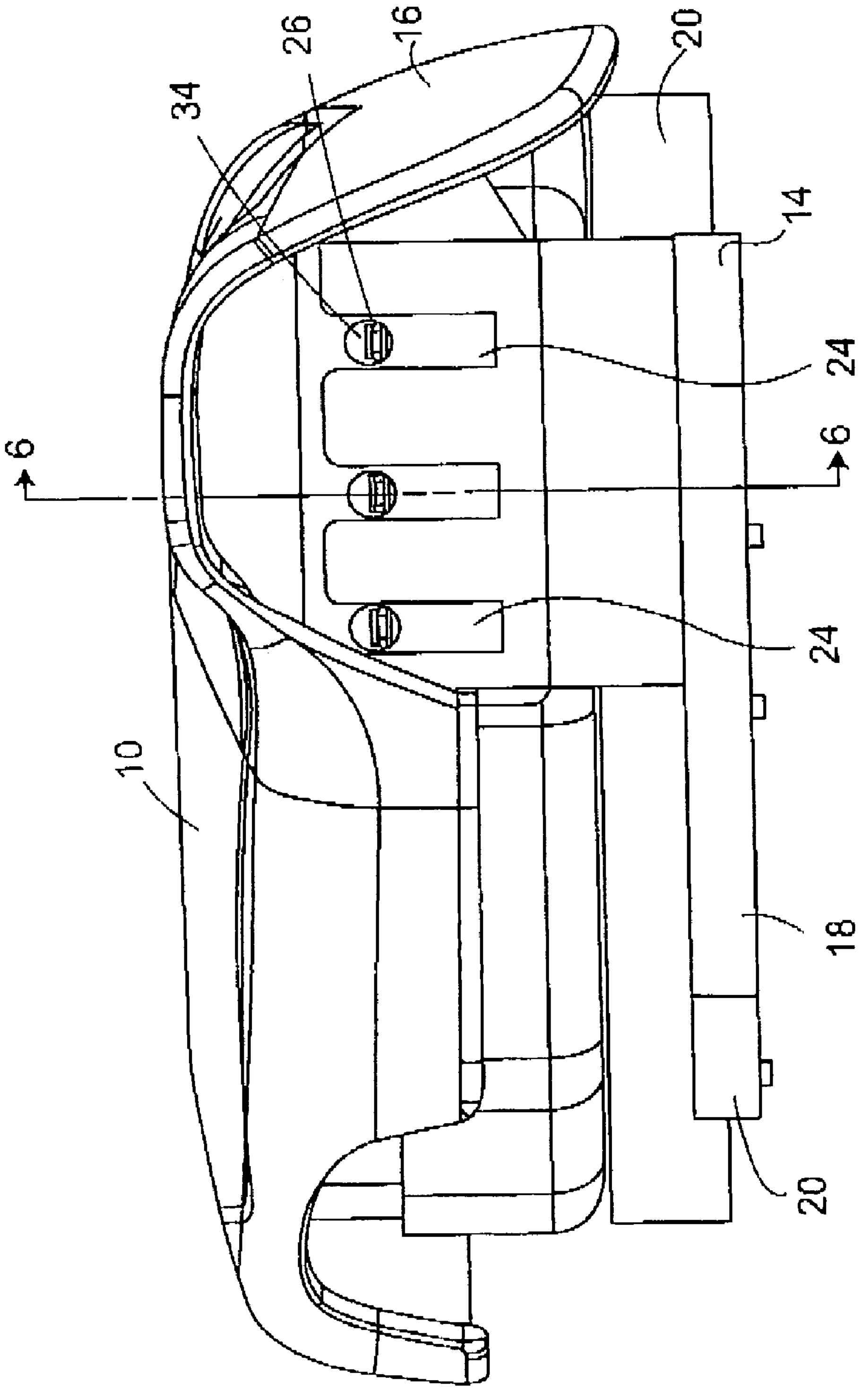
FIG. 5 is a side assembly view of the air bag mounted within the steering wheel.
Figure 6:
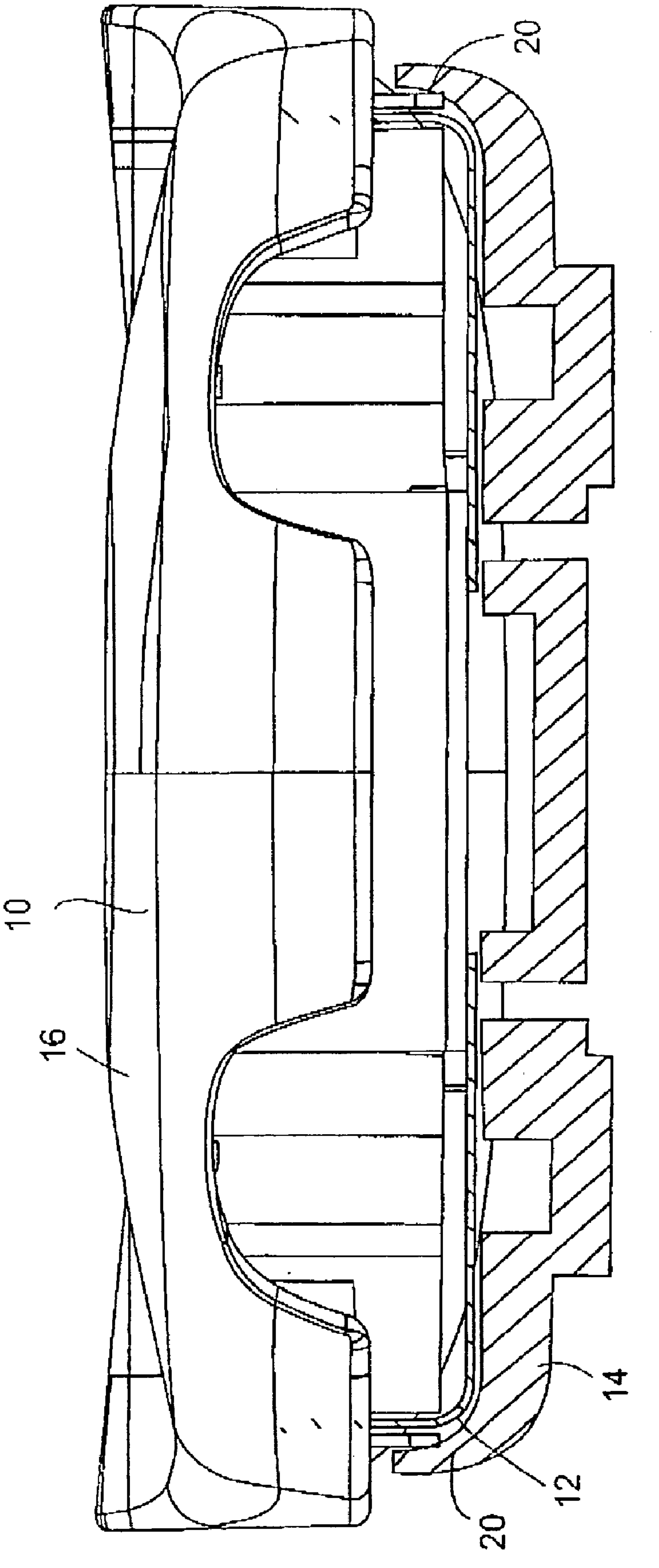
FIG. 6 is a side cross sectional view of a steering wheel and air bag assembly according to the teachings of the present invention.

FIGS. 5 and 6 represent side views of the module 10 coupled to the steering wheel armature 14. The module is assembled by snapping the cover retaining apertures 34 over the cover retaining flange 26. At the time of assembly of the module 10 to the steering wheel armature 14, the module 10 is electrically connected to a crash sensing system (not shown). The module 10 is slid between the side walls 20 of the steering wheel armature 14. During the insertion, the cover retaining flanges 26 are positioned into the slots 24.

During a deployment, inflation gasses fill the cushion, exerting significant forces on the sides 32 of the housing. As best seen in FIG. 6, the cover is retained during the deployment event between the side wall 20 of the armature 14 and the sides 32 of housing 12. This configuration utilizes the forces on the sides 32 from the deployment to restrain the cover onto the module mounting plate 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A steering wheel assembly comprising:

a housing (12) having a plurality of retaining flanges (26);

a steering wheel armature (14) having side walls (20) defining a plurality of slots (24) for receipt of the flanges (26); and a cover (16) including a plurality of retaining apertures (34) for receipt of the plurality of flanges (26) therethrough;

wherein said cover (16) is at least partially between said housing (12) and said steering wheel armature (14) and wherein the side wails (20) are configured to restrain bell mouthing of the housing during deployment.

2. The steering wheel assembly of claim 1 wherein the cover (16) defines a central opening (50).

3. The steering wheel assembly of claim 1 wherein the cover (16) further includes:

at least one tear seam (36);

at least one rip stop (48) adjacent to the tear seam (36); and wherein, the tear seam (36) has a circumferential portion defined by a radius (38) and further extends radially outward from the circumferential portion.

4. The steering wheel assembly of claim 2 further comprising a tear seam having an initiation end (40) beginning at and radiating from a circumference defined by a radius (38).

5. The steering wheel assembly of claim 4 wherein the tear seam (36) increases in thickness from the initiation end (40) to a terminal end (46).

6. The steering wheel assembly of claim 4 wherein the tear seam (36) defines a member which is configured to articulate near a terminal end (46).

7. A steering wheel assembly comprising:

a housing (12) at least partially disposed about an air bag cushion, said housing having at least one functional flange;

a steering wheel armature having side walls (20), the functional flange being adjacent to and received in one of the side walls (20);

a cover (16) retained between the housing (12) and the armature; and wherein, the cover (16) has a circumferential portion defined by a central radius (38) with at least one tear seam (36) radiating from the circumference portion and wherein at least one of the side walls is configured to reduce displacement of the functional flange during an airbag deployment wherein the steering wheel armature has at least one slot (24) for receipt of the functional flange (26).

8. The steering wheel assembly of claim 7 wherein the tear seam (36) has a circumferential portion defining a circumference.

9. The steering wheel assembly of claim 7 wherein the tear seam (36) has an initiation end (40) and a terminal end (46).

10. The steering wheel assembly of claim 7 wherein the cover (16) further; includes at least one rip stop (48) adjacent to the tear seam (36) and at least one retaining aperture (34) configured to receive the functional flange (26).

11. The steering wheel assembly of claim 9 wherein said tear seam (36) is constant in thickness from the initiation end (40) to the terminal end (46).

12. The steering wheel assembly of claim 9 wherein the tear seam (36) defines a member which is configured to articulate near the terminal end (46).

13. The steering wheel assembly of claim 10 wherein a terminal end (46) of the tear seam (36) is adjacent to the rip stop (48).

* * * * *